United States Patent [19]
Danisch et al.

[11] Patent Number: 5,673,528
[45] Date of Patent: Oct. 7, 1997

[54] SAFETY WALL FOR A BUILDING

[75] Inventors: Rüdiger Danisch, Erlangen; Manfred Hümmer, Höchstadt; Günter Liersch, Starnberg; Udo Peter, Essen, all of Germany

[73] Assignee: Siemens Aktiengesellschaft, Munich, Germany

[21] Appl. No.: 315,593

[22] Filed: Sep. 30, 1994

Related U.S. Application Data

[60] Continuation of PCT/EP93/00797, Apr. 1, 1993.

[30] Foreign Application Priority Data

Apr. 3, 1992 [DE] Germany ............... 42 11283.4
Apr. 13, 1992 [DE] Germany ............... 42 12225.2

[51] Int. Cl.$^6$ ............................................. G21C 13/02
[52] U.S. Cl. .............. 52/506.05; 52/223.2; 52/223.3; 52/249; 52/506.06; 52/410; 376/293; 376/295
[58] Field of Search ................... 52/223.2, 223.3, 52/245, 249, 506.05, 506.06, 410, 408, 169.14; 376/272, 293, 294, 295, 296

[56] References Cited

U.S. PATENT DOCUMENTS

| 462,953 | 11/1891 | Jackson | 52/169.14 |
|---|---|---|---|
| 1,647,907 | 11/1927 | Doty | 52/245 X |
| 1,888,039 | 11/1932 | Huff | 52/245 X |
| 2,791,117 | 5/1957 | Bailey . | |
| 2,992,175 | 7/1961 | Borst | 376/395 |
| 3,079,730 | 3/1963 | Donegan | 52/408 X |
| 3,092,933 | 6/1963 | Closner et al. | 52/169.14 X |
| 3,367,075 | 2/1968 | Pierce et al. | 52/249 |
| 3,424,239 | 1/1969 | Coudray | 52/223.2 X |

(List continued on next page.)

FOREIGN PATENT DOCUMENTS

| 128603 | 8/1948 | Australia | 52/410 |
|---|---|---|---|
| 28659 | 5/1981 | European Pat. Off. | 52/408 |
| 2183470 | 5/1972 | France . | |
| 2423333 | 11/1979 | France . | |
| 2603925 | 3/1988 | France . | |
| 663820 | 7/1938 | Germany . | |
| 1293438 | 4/1969 | Germany . | |
| 1659017 | 5/1971 | Germany . | |
| 2138046 | 3/1972 | Germany . | |
| 2330718 | 1/1974 | Germany . | |
| 2326071 | 12/1974 | Germany . | |
| 2554576 | 6/1977 | Germany . | |
| 2856013 | 6/1980 | Germany . | |
| 3137999 | 3/1983 | Germany . | |
| 3235185 | 3/1984 | Germany | 220/585 |
| 3321255 | 12/1984 | Germany . | |
| 8616698 | 9/1986 | Germany . | |
| 3608985 | 9/1987 | Germany . | |
| 3831188 | 3/1990 | Germany . | |
| 4-89959 | 3/1992 | Japan | 52/506.05 |
| 8100204 | 8/1982 | Netherlands | 52/506.06 |
| 11423 | 6/1901 | United Kingdom | 52/506.06 |
| 252948 | 6/1926 | United Kingdom | 52/408 |
| 942793 | 11/1963 | United Kingdom | 52/410 |
| 988412 | 4/1965 | United Kingdom | 376/293 |
| WO83/04063 | 11/1983 | WIPO | 52/410 |

OTHER PUBLICATIONS

SNR 300 Fast Breeder Reactor: Steel Containment —Design Erection, Testing in: Nuclear Engineering and Design 97.

*Primary Examiner*—Carl D. Friedman
*Assistant Examiner*—Laura A. Saladino
*Attorney, Agent, or Firm*—Herbert L. Lerner; Laurence A. Greenberg

[57] ABSTRACT

A wall, particularly a wall of a containment for a nuclear plant, a pool or a cavern, includes a bearing wall. A sealing element is disposed on at least one surface of the bearing wall and covers the bearing wall. A protective wall covers the sealing element. The protective wall is frictionally connected to the bearing wall. The protective wall may be formed of a plurality of parts. The frictional connection may be made by anchors as well as by prestressing or by adhesive bonding.

23 Claims, 3 Drawing Sheets

U.S. PATENT DOCUMENTS

| | | | |
|---|---|---|---|
| 3,454,080 | 7/1969 | Künzli | 52/249 X |
| 3,497,421 | 2/1970 | Thome . | |
| 3,505,769 | 4/1970 | Miron et al. | 52/249 |
| 3,562,977 | 2/1971 | Alleaume | 52/249 X |
| 3,568,385 | 3/1971 | Cruset et al. | 52/245 X |
| 3,590,540 | 7/1971 | Johnson . | |
| 3,605,366 | 9/1971 | Zakim | 52/410 X |
| 3,710,857 | 1/1973 | Meyer et al. | 376/295 X |
| 3,712,012 | 1/1973 | Meyer et al. | 52/245 X |
| 3,794,559 | 2/1974 | Davies et al. | 376/295 |
| 3,802,142 | 4/1974 | Fehr | 52/506.05 X |
| 3,881,288 | 5/1975 | Fay | 52/249 X |
| 3,922,413 | 11/1975 | Reineman | 428/119 |
| 3,990,941 | 11/1976 | Scholz | 52/223.2 X |
| 4,078,697 | 3/1978 | Schlosberg et al. | 376/294 X |
| 4,257,912 | 3/1981 | Fleischer et al. | 252/301.1 W |
| 4,279,701 | 7/1981 | Ebata et al. . | |
| 4,407,102 | 10/1983 | Boyack | 52/249 X |
| 4,408,420 | 10/1983 | Haase | 52/249 X |
| 4,479,334 | 10/1984 | Goode | 52/249 X |
| 4,513,550 | 4/1985 | Kotcharian | 52/249 |
| 4,776,145 | 10/1988 | Dykmans | 52/249 X |
| 4,800,128 | 1/1989 | Schacht et al. | 52/169.14 X |
| 4,970,842 | 11/1990 | Kappeler et al. . | |
| 5,087,409 | 2/1992 | Wedeilsborg et al. . | |
| 5,231,811 | 8/1993 | Andrepont et al. | 52/249 |
| 5,402,455 | 3/1995 | Angelo, II et al. | 376/272 |
| 5,513,474 | 5/1996 | Scharkowski | 52/249 X |

SAFETY WALL FOR A BUILDING

CROSS-REFERENCE TO RELATED APPLICATION

This application is a Continuation of International Application Serial No. PCT/EP93/00797, filed Apr. 1, 1993.

BACKGROUND OF THE INVENTION

1. Field of the Invention:

The invention relates to a wall, particularly a wall of a containment for a nuclear plant, a pool or a cavern.

Such a wall may also be part of another structure which has to comply with strict safety requirements.

A wall of a building which includes an inner structure associated with an outer structure is known from DE 25 54 576 A1. Each structure has an independent foundation. The structures may be supported against one another. A space left free between the two structures can be filled with a material possessing sealing properties.

Such a wall must always be constructed and built complete, because the inner structure must carry internal fittings.

SUMMARY OF THE INVENTION

It is accordingly an object of the invention to provide a wall, which overcomes the hereinafore-mentioned disadvantages of the heretofore-known devices of this general type and with which gas-tight sealing can be effected rapidly and reliably and with simple means. The means to be employed for the sealing should in addition be reliably protected against mechanical or other actions. In particular, reliable sealing of the wall should be ensured even when forces act on it.

With the foregoing and other objects in view there is provided, in accordance with the invention, a wall, particularly a wall of a containment for a nuclear plant, a pool or a cavern, comprising a bearing wall having surfaces; a sealing element covering at least one of the surfaces of the bearing wall; and a protective wall covering the sealing element; the protective wall being frictionally or force-lockingly connected to the bearing wall. A force-locking connection is one which connects two elements together by force external to the elements, as opposed to a form-locking connection which is provided by the shapes of the elements themselves.

The sealing element seals the bearing wall gas-tightly and/or liquid-tightly. The sealing element is protected by the protective wall against mechanical actions. Such actions may be impinging parts, radiation, chemical actions or high temperature. The protective wall does not need a foundation of its own, since it is fastened solely to the bearing wall. Since this is a frictional connection, no relative displacement of the protective wall at right angles to the bearing wall can occur. The sealing element is thus clamped between the bearing wall and the protective wall. Detachment or loosening of the sealing element is impossible.

Since the protective wall is held by the bearing wall and thus rests on the same foundation, actions from the outside also cannot displace the protective wall relative to the bearing wall. Actions from the outside cannot damage the sealing element.

If the wall is part of a building, the sealing element and the protective wall may be applied to the bearing wall from the inside or from the outside according to choice. The sealing element is reliably protected by the protective wall against actions from the inside of the containment, particularly when a sealing element and a protective wall are disposed on the inner surface of the containment wall of a nuclear plant.

In accordance with another feature of the invention, the bearing wall is prestressed and thereby frictionally or force-lockingly connected to the protective wall. For this purpose, the bearing wall should be prestressed only when the sealing element and the protective wall have been constructed. A frictional connection between the bearing wall and the protective wall is achieved through the prestressing of the bearing wall.

Alternatively, the protective wall may also be prestressed.

In accordance with a further feature of the invention, the protective wall is frictionally or force-lockingly connected to the bearing wall by anchors which pass through the sealing element, and the sealing element is gas-tightly and/or liquid-tightly connected to the anchors. Although the anchors pass through the sealing element, it is nevertheless ensured that there are no leaks at the penetration points. Gas-tight closure is thus always ensured.

In accordance with an added feature of the invention, the sealing element is frictionally or force-lockingly connected to the bearing wall, and/or the protective wall to the sealing element, by at least one adhesive bond. If both of these connections are adhesive bonds, a rapidly produced frictional connection is obtained between the bearing wall and the protective wall.

In accordance with an additional feature of the invention, the protective wall is formed of a plurality of parts. A protective wall of this kind can be constructed rapidly. Even in the case of an addition to an existing wall, particularly a wall of a building, a protective wall of this kind can be quickly installed.

In accordance with yet another feature of the invention, each part is frictionally or force-lockingly connected to the bearing wall by anchors or by an adhesive bond. The protective wall can then be built up piece by piece. If the parts of the protective wall are adhesively bonded to the sealing element, anchors or other fastening means or constructions can be entirely or partially dispensed with.

In accordance with yet a further feature of the invention, the parts are connected to one another by clamp elements, whereby the parts are frictionally or force-lockingly connected to the bearing wall. Such a configuration can be used particularly well for round walls.

Suitable clamp elements are bolts, anchors fasteners etc.

In accordance with yet an added feature of the invention, there is provided a supporting structure disposed on the protective wall, whereby the parts of the protective wall are frictionally pressed against the bearing wall.

In accordance with yet an additional feature of the invention, the parts are disposed in such a way that gaps are left free between them. Thermal expansion of the parts is thus possible. The gaps can be grouted. The parts may be prefabricated as finished parts, separately transported to the site and then used for the wall. A sealing element with a supporting wall can advantageously be constructed quickly, reliably and inexpensively in this way. Even its addition to a completed building can be effected rapidly and reliably.

In accordance with again another feature of the invention, the sealing element is or contains a layer being formed of a material which is elastic and/or plastic and/or has a viscosity which increases when it is heated. Elastic or plastic material bridges over cracks or porosity. If the wall surrounds a hot space, a layer of a material having a viscosity which increases when it is heated becomes relatively soft with increasing heating and then fills all of the gaps in the space between the bearing wall and the protective wall and even breaches in the walls. The sealing properties of the layer are thereby further improved.

In accordance with again a further feature of the invention, the sealing element is or contains a resistant layer, particularly of glass fiber reinforced or carbon fiber reinforced or metal fiber reinforced plastic laminate. A layer of this kind withstands the action of radiation and high temperature. It is also resistant to corrosion. Such a layer can be adhesively bonded to the surface of the wall. The layer is then protected against actions by the protective wall, which usually is formed of concrete. The protective wall need not be gas-tight. However, it is necessary that points of penetration of anchors through the sheet are gas-tight. For this purpose the sheet can be adhesively bonded to the anchors.

In accordance with again an added feature of the invention, the protective wall is temperature resistant and/or radiation resistant and/or impact resistant and/or impact damping and/or corrosion resistant. Optimum protection of the sealing element is thereby achieved. Furthermore, however, the bearing wall is also protected by a protective wall of this kind. The bearing wall usually supports a building and absorbs forces. It must therefore be distinctly thicker than the protective wall. Due to the properties of the protective wall, the bearing wall need not be made of an extravagant and expensive material which is resistant to radiation, heat and corrosion. All actions are absorbed by the protective wall.

In accordance with again an additional feature of the invention, there are provided fasteners which are first frictionally or force-lockingly connected by anchors to the bearing wall. These fasteners hold the parts of the protective wall. With such fasteners, simple and rapid mounting of the parts of the protective wall is possible.

In accordance with still another feature of the invention, the fasteners are double T-shaped. One of the two parallel legs or limbs of such a fastener is frictionally or force-lockingly connected to the bearing wall by at least one anchor. However, as a rule a plurality of anchors are necessary. The double T-shaped fastener holds two neighboring parts of the protective wall.

With such fasteners, a protective wall can be mounted quickly and reliably. This is important particularly when existing walls of a building have to be provided with a protective wall of this type.

In accordance with a concomitant feature of the invention, the sealing element has cavities which can be monitored for leaks. For this purpose, various methods known for such applications can be used. For example, with the aid of a pressure gauge the pressure in the cavity can be monitored, or by means of a sensor it is possible to monitored whether or not a substance normally existing only outside the sealing element is contained in the cavities. In both cases it can be ascertained whether or not the sealing element itself has been damaged.

Not only is the wall according to the invention gas-tight, but in addition the sealing element is protected by the protective wall against actions. The sealing element and the protective wall are held by the bearing wall, so that displacements of the bearing wall and of the protective wall relative to one another, and consequent loading of the sealing element, do not occur. In particular, the sealing element and the protective wall can be mounted quickly and reliably even as additions to an otherwise finished building. The fact that the protective wall may be composed of individual parts, which can be prefabricated as finished parts, contributes to this.

If the wall borders a building and the sealing element and the protective wall are disposed on the inner surface of the building, actions from the interior of the building cannot impair the leak-tightness of the latter because the protective wall protects the sealing element. The wall according to the invention can be used to particular advantage for a containment of a nuclear power station. However, it can also be used for other buildings. A building of this kind may also be a storage pool or a cavern.

Other features which are considered as characteristic for the invention are set forth in the appended claims.

Although the invention is illustrated and described herein as embodied in a wall, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
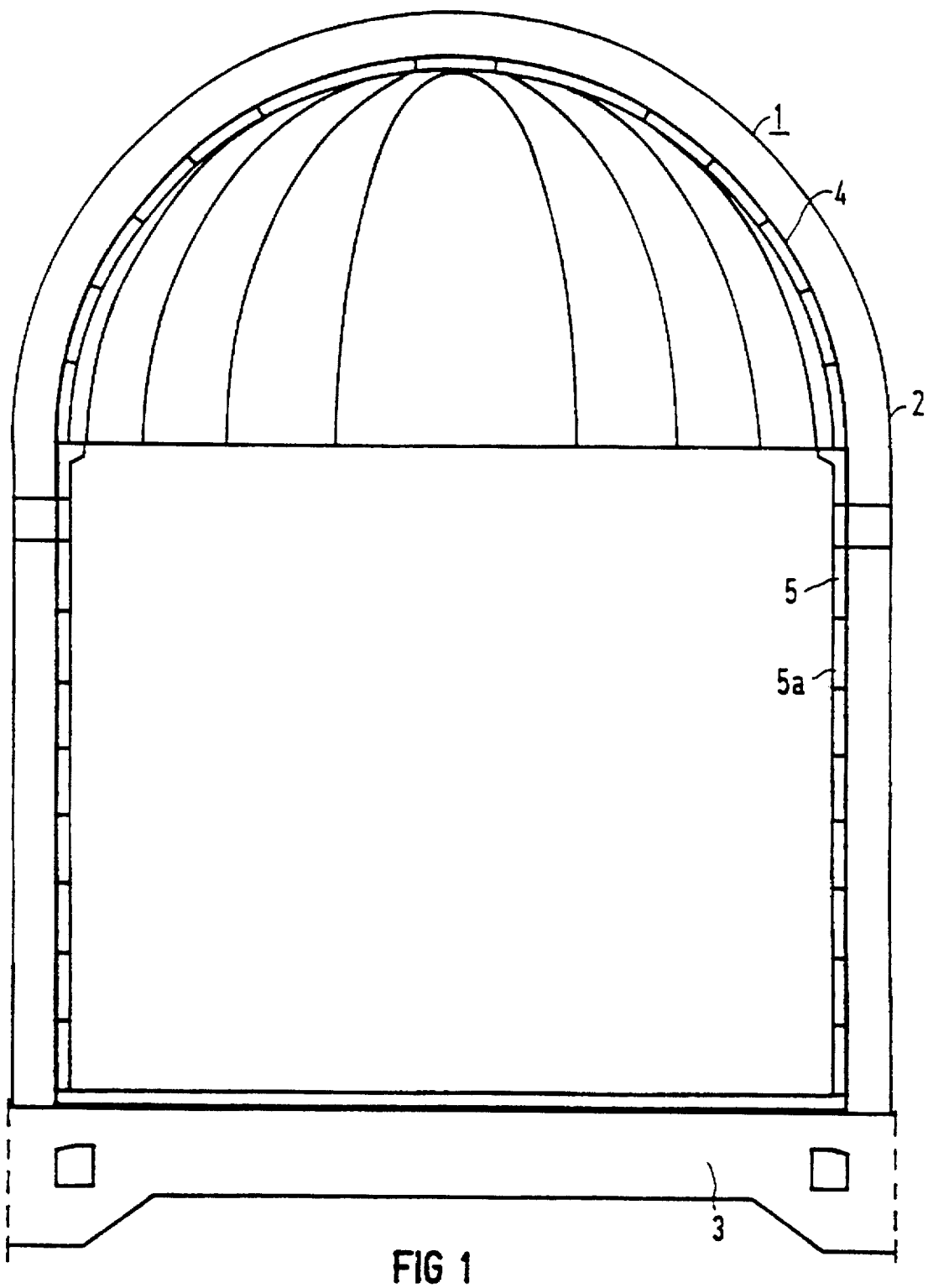
FIG. 1 is a diagrammatic, longitudinal-sectional view of a building including a bearing wall, a sealing element and a protective wall.

Referring now to the figures of the drawing in detail and first, particularly, to FIG. 1 thereof, there is seen a building having a wall 1 which is supported on a foundation plate 3. The wall 1 includes a bearing wall 2 having an inner surface which is covered by a sealing element 4. This sealing element 4 is also disposed on the foundation plate 3, so that it surrounds the entire interior space of the building. In order to provide protection for the sealing element 4, which may be a layer of a plastic laminate, a protective wall 5 which is part of the wall 1 is disposed in such a way as to cover the sealing element 4 from the inside. The sealing element 4 may be adhesively bonded on the bearing wall 2, and the protective wall 5 may be adhesively bonded on the sealing element 4. The protective wall 5 may also be frictionally or force-lockingly connected to the bearing wall 2 by anchors which are not shown in FIG. 1, or by clamp elements. In this case the sealing element 4 is gas-tightly connected to the anchors. The protective wall 5 may be formed of a plurality of parts 5a. Such parts 5a may be prefabricated as finished concrete parts or finished cast parts.

Figure 2:
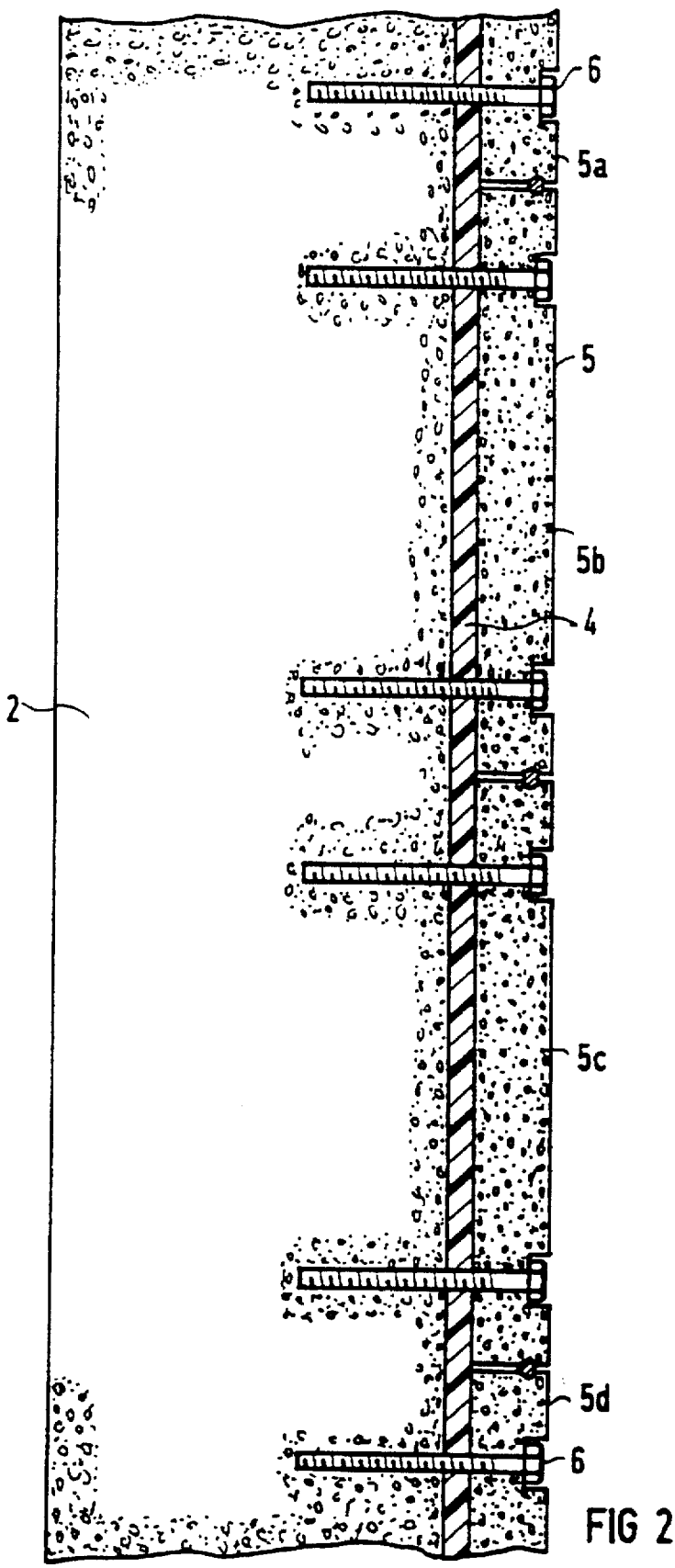
FIG. 2 is an enlarged, fragmentary, longitudinal-sectional view of part of the bearing wall with a sealing element and a protective wall.

According to FIG. 2, the sealing element 4 is disposed on the inner surface of the bearing wall 2. It may be adhesively bonded there. The protective wall 5, which is formed of individual parts 5a to 5d, serves to protect the sealing element 4. Each one of these parts 5a to 5d is frictionally or force-lockingly connected to the bearing wall 2 by anchors 6. However, it may also be adhesively bonded on the sealing element 4. The anchors 6 pass through the sealing element 4. At penetration points the sealing element 4 is gas-tightly adhesively bonded to the anchors 6.

It is thereby ensured that the bearing wall 2 is gas-tightly closed on the inside by the sealing element 4. The protective wall 5 need not be gas-tight. It protects the sealing element 4 against mechanical actions, for example from the interior of the building. The protective wall 5 also protects the sealing element 4 against high temperatures, radiation and chemical attack. The protective wall 5 is made of temperature and radiation resistant material. The sealing element 4 is or contains a gas-tight layer. The latter is formed, for example, of an elastic or plastic material or of material having a viscosity which increases when it is heated. Due to the protective wall 5, the bearing wall 2 need not be formed of radiation and temperature resistant material. Its manufacture can therefore be less cost intensive.

Figure 3:
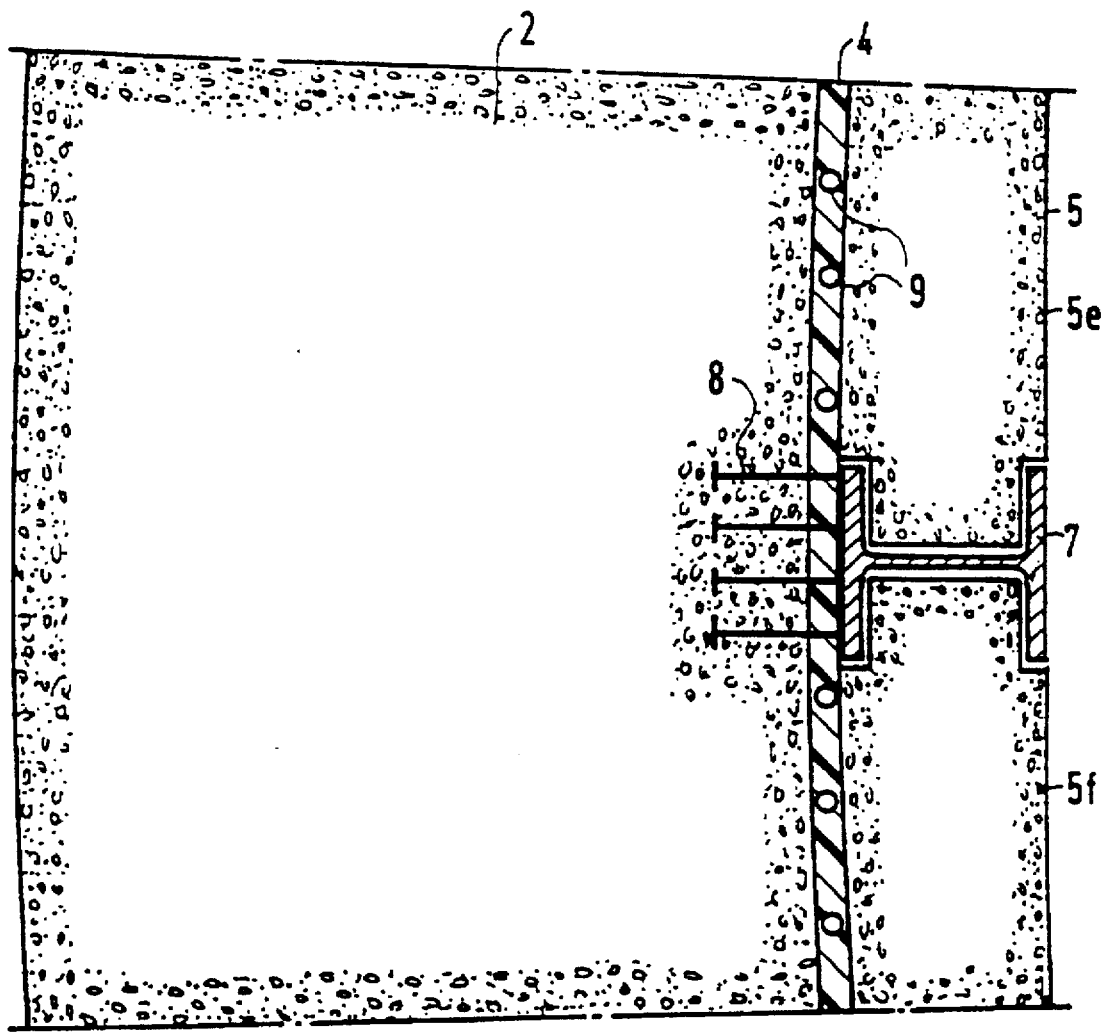
FIG. 3 is a fragmentary, longitudinal-sectional view of another embodiment of a bearing wall with a sealing element and a protective wall.

FIG. 3 shows another variant for the installation of a multipart protective wall 5. For this purpose double T-shaped fasteners 7 are therefore frictionally or force-lockingly connected to the bearing wall 2 by anchors 8. The elements 7 and 8 together form a supporting structure. The anchors 8 pass through a sealing element 4 that was previously mounted on the inner surface of the bearing wall 2, and the sealing element 4 is gas-tightly adhesively bonded to the anchors 8. The double T-shaped fastener 7 holds two neighboring parts 5e and 5f of the protective wall 5.

The illustrated building can be sealed gas-tightly, for example on the inside, by simple means and inexpensively, even in the case of previously existing buildings, while the sealing element 4 is protected against mechanical stresses resulting from movements of the building and also resulting from impinging parts, even from the interior of the building. In addition, it is protected against the action of temperature and radiation.

The sealing properties can also be correspondingly applied to sealing against liquids.

The sealing configurations permit sealing both from inside to outside and, corresponding to static conditions, sealing from outside to inside.

In order to check leak-tightness, the sealing element 4 may have cavities 9 which can be connected to a non-illustrated sensor in order to enable damage to the sealing element 4 to be recognized by the penetration into the cavities 9 of a substance which is detected by the sensor.

We claim:

1. A safety wall for a building, comprising:

a bearing wall having surfaces and defining a supporting part of the safety wall;

a sealing element covering at least one of said surfaces of said bearing wall; and a protective wall disposed immediately adjacent to and covering said sealing element and protecting said bearing wall and said sealing element against thermomechanical loads and radiation;

said protective wall being force-lockingly connected to and supported by said bearing wall, and said sealing element being at least partly formed of a layer of a material having at least one property selected from the group consisting of elasticity, plasticity and increasing viscosity upon being heated.

2. The wall according to claim 1, wherein at least one of said bearing wall and said protective wall is prestressed for frictionally connecting said bearing wall to said protective wall.

3. The wall according to claim 1, including anchors passing through said sealing element and frictionally connecting said protective wall to said bearing wall, said sealing element being connected to said anchors.

4. The wall according to claim 3, wherein said sealing element is gas-tightly connected to said anchors.

5. The wall according to claim 3, wherein said sealing element is liquid-tightly connected to said anchors.

6. The wall according to claim 3, wherein said sealing element is gas-tightly and liquid-tightly connected to said anchors.

7. The wall according to claim 1, including at least one adhesive bond frictionally connecting said sealing element to at least one of said bearing wall and said protective wall.

8. The wall according to claim 1, wherein said protective wall is formed of a plurality of parts.

9. The wall according to claim 8, including anchors frictionally connecting each part of said protective wall to said bearing wall.

10. The wall according to claim 8, including at least one adhesive bond frictionally connecting said sealing element to at least one of said plurality of parts of said protective wall and said bearing wall.

11. The wall according to claim 8, including clamp elements connecting said parts of said protective wall to one another, for frictionally connecting said parts of said protective wall to said bearing wall.

12. The wall according to claim 8, including a supporting structure disposed on said protective wall, for frictionally connecting said parts of said protective wall to said bearing wall.

13. The wall according to claim 8, wherein said parts of said protective wall are mutually spaced apart defining gaps therebetween.

14. The wall according to claim 8, including anchors and fasteners being frictionally connected by said anchors to said bearing wall, said parts of said protective wall being held by said fasteners.

15. The wall according to claim 14, wherein said fasteners are double T-shaped and have legs, each of said fasteners hold two respective neighboring parts of said protective wall, and some of said legs of said fasteners are each frictionally connected to said bearing wall by at least one of said anchors.

16. The wall according to claim 1, wherein said sealing element is at least partly formed of a resistant layer.

17. The wall according to claim 16, wherein said resistant layer is selected from the group consisting of glass fiber reinforced, carbon fiber reinforced and metal fiber reinforced plastic laminate.

18. The wall according to claim 1, wherein said protective wall is formed of at least one material selected from the group consisting of temperature resistant material, radiation resistant material, impact resistant material, impact damping material and corrosion resistant material.

19. The wall according to claim 1, wherein said sealing element has at least one cavity formed therein to be monitored for penetrating substances.

20. In combination with a nuclear plant, a safety wall for a containment of the nuclear plant, comprising:

a bearing wall having surfaces and defining a supporting part of the safety wall;

a sealing element covering at least one of said surfaces of said bearing wall; and a protective wall disposed immediately adjacent to and covering said sealing element and protecting said bearing wall and said sealing element against thermomechanical loads and radiation;

said protective wall being force-lockingly connected to and supported by said bearing wall and said sealing element being at least partly formed of a layer of a material having at least one property selected from the group consisting of elasticity, plasticity and increasing viscosity upon being heated.

21. A safety wall for a building, comprising:

a bearing wall having surfaces and defining a supporting part of the safety wall;

a sealing element covering at least one of said surfaces of said bearing wall; and a protective wall disposed immediately adjacent to and covering said sealing element and protecting said bearing wall and said sealing element against thermomechanical loads and radiation;

said protective wall being force-lockingly connected to and supported by said bearing wall, and said protective wall being formed of a plurality of parts, said parts of said protective wall being mutually spaced apart defining gaps therebetween.

22. A safety wall for a building, comprising:

a bearing wall having surfaces and defining a supporting part of the safety wall;

a sealing element covering at least one of said surfaces of said bearing wall; and a protective wall disposed immediately adjacent to and covering said sealing element and protecting said bearing wall and said sealing element against thermomechanical loads and radiation;

said protective wall being force-lockingly connected to and supported by said bearing wall, and said sealing element being at least partly formed of a resistant layer, said resistant layer being selected from the group consisting of glass fiber reinforced plastic laminate, carbon fiber reinforced plastic laminate and metal fiber reinforced plastic laminate.

23. A safety wall for a building, comprising:

a bearing wall having surfaces and defining a supporting part of the safety wall;

a sealing element covering at least one of said surfaces of said bearing wall;

a protective wall disposed immediately adjacent to and covering said sealing element and protecting said bearing wall and said sealing element against thermomechanical loads and radiation;

said protective wall being formed of a plurality of parts and being force-lockingly connected to and supported by said bearing wall; and anchors and fasteners being frictionally connected by said anchors to said bearing wall, said parts of said protective wall being held by said fasteners, wherein said fasteners are double T-shaped and have legs, each of said fasteners hold two respective neighboring parts of said protective wall, and some of said legs of said fasteners are each frictionally connected to said bearing wall by at least one of said anchors.

* * * * *